(12) United States Patent
Chapougnot

(10) Patent No.: US 7,726,103 B2
(45) Date of Patent: Jun. 1, 2010

(54) RESILIENT BACKING MEMBER FOR THE USE WITH AN IMPULSE HEATING ELEMENT

(75) Inventor: Stephan J. Chapougnot, Lesches (FR)

(73) Assignee: Liqui-Box Canada Inc., Whitby, Ontario (CA)

( * ) Notice: Subject to any disclaimer, the term of this patent is extended or adjusted under 35 U.S.C. 154(b) by 74 days.

(21) Appl. No.: 11/985,417

(22) Filed: Nov. 15, 2007

(65) Prior Publication Data

US 2008/0115461 A1 May 22, 2008

Related U.S. Application Data

(60) Provisional application No. 60/859,733, filed on Nov. 17, 2006.

(51) Int. Cl.
*B65B 51/14* (2006.01)
(52) U.S. Cl. ............... 53/477; 53/450; 53/451; 53/456; 53/574; 53/373.7; 53/373.9; 53/158; 53/548; 493/194; 493/203; 493/209
(58) Field of Classification Search ........... 53/450–451, 53/455–456, 477, 373.7, 375.9, 158, 537, 53/545, 548, 574; 493/189, 194, 199, 203, 493/208–209
See application file for complete search history.

(56) References Cited

U.S. PATENT DOCUMENTS

| 3,551,259 | A | * | 12/1970 | Schwarzkopf | 156/581 |
|---|---|---|---|---|---|
| 3,667,593 | A | | 6/1972 | Pendleton | |
| 3,719,021 | A | * | 3/1973 | Rosenberg | 53/551 |
| 3,830,681 | A | * | 8/1974 | Wilson | 156/583.2 |
| 3,845,606 | A | * | 11/1974 | Wilson | 53/425 |
| 3,868,285 | A | | 2/1975 | Troy | |
| 4,019,947 | A | * | 4/1977 | Stock et al. | 156/510 |
| 4,064,776 | A | | 12/1977 | Walitalo et al. | |
| 4,140,046 | A | * | 2/1979 | Marbach | 493/203 |

(Continued)

FOREIGN PATENT DOCUMENTS

CA 2129125 11/1993

(Continued)

OTHER PUBLICATIONS

Automated Packaging Systems Inc., Air Pillows include perforations to facilitate packaging; AirPouch Introduces New Air Pillow Material with EZ-Tear Perforations; Press Release Date Dec. 6, 2004 (news.thomasnet.com/printready.html?prid=458257; printed Aug. 11, 2006.

(Continued)

*Primary Examiner*—Christopher Harmon

(57) ABSTRACT

A resilient backing member for use in cooperation with an impulse heating element comprises a resilient body having a longitudinal shoulder surface and a longitudinal intermittent raised edge protruding from the shoulder surface. The resilient backing member is for use in cooperation with an impulse heating element for sealing layers of thermoplastic film together and for either forming a sealed portion on the film, a rupturable portion on the film or severing the film. Accordingly, the resilient backing member can be used on a pouch filling machine to produce a string of sealed pouches connected by a rupturable portion or a sealed portion, and filled with flowable material without the use of a separate cutting blade.

15 Claims, 5 Drawing Sheets

U.S. PATENT DOCUMENTS

| | | | |
|---|---|---|---|
| 4,981,546 A | | 1/1991 | Bergevin |
| 5,094,657 A | * | 3/1992 | Dworak et al. ............... 493/208 |
| 5,181,365 A | | 1/1993 | Garvey et al. |
| 5,221,567 A | | 6/1993 | Baker |
| 5,247,779 A | | 9/1993 | Wirsig et al. |
| 5,355,656 A | | 10/1994 | Perrett |
| 5,415,724 A | | 5/1995 | Perrett |
| 5,673,534 A | * | 10/1997 | Fowler ...................... 53/133.4 |
| 6,041,580 A | | 3/2000 | Wojtech |
| 6,162,468 A | | 12/2000 | Stanley et al. |
| 6,550,229 B2 | | 4/2003 | Sperry et al. |
| 6,623,829 B1 | * | 9/2003 | Fuss et al. ..................... 428/71 |
| 6,775,962 B1 | | 8/2004 | Cosmo |
| 6,874,394 B1 | | 4/2005 | Hull, Jr. et al. |
| 6,917,014 B2 | | 7/2005 | Makutonin et al. |
| 6,955,846 B2 | | 10/2005 | Lerner |
| 2004/0231291 A1 | | 11/2004 | Slovencik et al. |

FOREIGN PATENT DOCUMENTS

| | | |
|---|---|---|
| EP | 0042586 | 12/1981 |
| EP | 0492380 | 12/1991 |
| EP | 0999138 | 5/2000 |
| EP | 1449769 | 8/2004 |
| GB | 2350597 | 6/2000 |
| GB | 2355955 | 2/2002 |
| WO | WO 93/21003 | 10/1993 |
| WO | WO 93/23235 | 11/1993 |
| WO | WO 97/23398 | 7/1997 |
| WO | WO 00/59784 | 10/2000 |
| WO | WO 03/033263 | 4/2003 |

OTHER PUBLICATIONS

Ropex Industrie-Elektronik., Cirus—Advanced Heater Technology (www.ropex.de/pdf-download/info/cirus_e.pdf); printed Nov. 7, 2006.

* cited by examiner

RESILIENT BACKING MEMBER FOR THE USE WITH AN IMPULSE HEATING ELEMENT

This application claims priority to provisional patent application 60/859,733 filed Nov. 17, 2006.

FIELD OF THE INVENTION

The present invention relates to a resilient backing member for use with an impulse sealing element and more specifically to the production of a string of a plurality of sealed pouches connected by a rupturable portion and filled with flowable material.

BACKGROUND OF THE INVENTION

Packaging pouches are typically made on vertical form, fill and seal machines. Using such a machine, a flat web of synthetic thermoplastic film is unwound from a roll and formed into a continuous tube in a tube forming operation, by sealing the longitudinal edges of the film together to form a lap seal or a fin seal. The tube thus formed is pulled vertically downwards to a filling station. The tube is then collapsed across a transverse cross-section of the tube, the position of the cross-section being at a sealing device below the filling station. A transverse heat seal is made by the sealing device at the collapsed portion of the tube, thus making an airtight seal across the tube. The sealing device generally comprises a pair of jaws. Conventional sealing devices used for this application are of impulse heat sealing type and are sold under the trade-mark ROPEX.

After making the transverse seal, but before the jaws of the sealing device are opened, a quantity of material to be packaged, for example a liquid is caused to enter the tube at the filling station, and to fill the tube upwardly from the aforementioned transverse seal. The tube is then caused to move downwardly a predetermined distance. This movement may be under the influence of the weight of the material in the tube, or it may be caused by pulling or mechanically driving the tube. The jaws of the sealing device are closed again, thus collapsing the tube at a second transverse section. The second transverse section may be above, usually just above the air/material interface in the tube, or the second transverse section may be below the air/material interface. In these machines, the sealing device seals and severs the tube transversely at the second transverse section. The material filled portion of the tube is now in the form of a pillow shaped pouch. Thus the sealing device has sealed the top of the filled pouch and sealed the bottom of the next to be formed pouch, all in one operation. The filling of the product may be conducted on a continuous or intermittent basis. One such vertical form, fill and seal machine of the type described above is sold under the trade-mark PREPAC. Other suitable machines are sold under the trade-marks INPACO and ELECSTER.

A variety of flowable materials may be packaged in this manner, for example, milk, syrups, sauces, juices, water and the like. The term "flowable material" is meant to encompass materials which are flowable under gravity or may be pumped. Such materials may include emulsions, pastes, peanut butter, preserves, dough, ground meat, powders, detergents, oils and granular solids. It is anticipated that the pouches could be used for containing flowable materials, in particular foods that are packaged under sterile, pasteurized or aseptic conditions.

The pouches produced through this type of process can be manufactured to contain any volume of flowable material. In the situation where drinking fluids are packaged in this fashion, a typical size might be 250 mls or 500 mls. In such instance, it is possible to consume the fluid directly from the pouch.

In some circumstances, it is desirable that such pouches be produced as strings of a plurality of sealed pouches connected together and that they be easily separable in order to be sold individually. In this case it is essential that the pouches in the strings be easily separated without the potential of tearing open the adjacent pouches. There are several references that disclose machines that are directed towards producing strings of pouches that can be separated by tearing or rupturing a rupturable portion between adjacent pouches. For example, such machines are disclosed in U.S. Pat. No. 4,064,776, U.S. Patent Application Publication No. 2004/0231291 A1, PCT Patent Application No. WO 00/59784, European Patent Application No. 1 449 769 A1, European Patent Application No. 0 042 586 and UK Patent Application No. 2 350 597 A. These machines make use of sealing jaws that use heat to produce the seal between adjacent pouches, in conjunction with a separate cutting blade that physically cuts perforations in the vicinity of the seal produced by the sealing jaws in order to produce a rupturable portion between adjacent pouches.

There are several factors that must be considered when using a separate cutting blade to create the rupturable portion. Firstly, the complexity of the machine is significantly increased as additional moving parts are required to operate the blade and the operation of the blade must be properly coordinated with the other operations of the machine. Further, since film materials typically used to produce the pouches such as polyethylene are notably abrasive, the blade eventually gets dull and must be replaced or sharpened on a regular basis. Furthermore, in order to change the design of the pouches or rupturable portion produced, the cutting blade must be replaced. These factors lead to increased maintenance and downtime of the machine, and, can also entail health and safety concerns as the service personnel is required to handle the sharp cutting blades.

Another drawback of using a separate cutting blade is that since the perforations are preferably created in the vicinity of the heat sealed portion, the film is generally still warm and softened in this area following the heat sealing operation. The warm and softened film can foul the cutting blade and affect its performance. Consequently, the blade must be kept relatively clean and sharp in order to ensure proper cutting. One known method of addressing this problem is to use the cutting blade to perforate the film at a distance from the heat sealed portion. This allows the blade to perforate the film in an area where the film is cooler and also creates a suitable clearance between the blade and the pouch so as to reduce the risk of the pouch getting damaged by the cutting blade. Evidently, this requires a larger seal area to be formed and therefore increases film consumption. Another method is to allow a period of time to expire between the heat sealing operation and the cutting operation in order to allow the film to cool. However, this increases the cycle time of the filling machine.

Since, pouches are meant to be one-time use packages it is appropriate that the manner in which they are manufactured is as economical as possible, without sacrificing the basic packaging requirements for the materials in question. Therefore, there is a need for a device and method that can reliably produce strings of sealed pouches connected by a rupturable portion and filled with flowable material in a fast, consistent and economic manner.

SUMMARY OF THE INVENTION

Accordingly, there are many advantages to the present invention such as the more economical manufacturing process, and the lack of any requirement for a separate cutting blade of any sort in order to produce a rupturable portion between adjacent sealed pouches formed from a web of film.

According to one broad aspect, the present invention provides a resilient backing member for use in cooperation with a conventional impulse heating element on a conventional pouch filling machine such as a vertical form, fill and seal machine. A person skilled in the art would also appreciate that the resilient backing member could also be used on other types of filling machines irrespective of the orientation. The resilient backing member is used for sealing layers of film together and for forming a rupturable portion of the film layers. The resilient backing member comprises a resilient body having a longitudinal shoulder surface, and, a longitudinal intermittent raised edge protruding from the shoulder surface.

The shoulder surface of the resilient backing member is mainly used to produce the seal between the layers of film, whereas the raised edge is mainly used to form the rupturable portion on the film or to sever the film. Preferably, the rupturable portion formed on the film by the resilient backing member may comprise a perforation and/or a weakened area of reduced thickness.

The raised edge of the resilient backing member may comprise a plurality of spaced apart portions that are in longitudinal alignment. Preferably, the raised edge may also have a triangular transverse cross-sectional profile.

Advantageously and depending on the shape of the seal that is desired, the resilient body of the resilient backing member may have a linear longitudinal profile, curved longitudinal profile or a combination thereof.

According to another aspect, the present invention also provides a method for producing a string of a plurality of sealed pouches connected by a rupturable portion and filled with flowable material, the method comprising the steps of:
  (a) providing a heating jaw having a heating element and a corresponding backing jaw having a resilient backing member, the resilient backing member having a resilient body with a longitudinal shoulder surface and a longitudinal intermittent raised edge protruding from the shoulder surface;
  (b) driving a desired amount of a tubular web of film filled with flowable material between the heating jaw and the backing jaw;
  (c) closing the jaws by pressing the resilient backing element and the heating element together, activating the heating element using perforating parameters to produce the transverse rupturable portion across the tubular web of film and provide seals on adjacent pouches, and, opening the jaws;
  (d) repeating steps (b) and (c) to produce a desired number of pouches in the string; and
  (e) separating a final pouch of the string from the tubular web of film.

Advantageously, the additional step of driving a desired amount of a tubular web of film filled with flowable material between the heating jaw and the backing jaw may be performed immediately before step (e) of the above method; and, step (e) may be performed by closing the jaws and thereby pressing the resilient element and the heating element together, activating the heating element using cutting parameters to transversely sever the tubular web of film and provide seals on the final pouch and on the tubular web of film, and, opening the jaws. Preferably, in such case, the cutting parameters used to activate the heating element cause the temperature of the heating element to rise to a cutting temperature and the perforating parameters cause the temperature of the heating element to rise to a perforating temperature wherein the cutting temperature may be higher than the perforating temperature.

Advantageously, the heating element may also be controlled by a programmable control system that is programmed to activate the heating element with the cutting parameters after the heating element has been repeatedly activated with the perforating parameters for a desired number of times.

According to a further aspect, the present invention also provides a string of a plurality of sealed pouches connected by a rupturable portion, containing flowable material and formed from a tubular web of film, prepared using the method described above. The rupturable portion connecting adjacent pouches may comprise a perforation and/or a weakened region of reduced thickness. While the typical size of pouches produced using the above method is around 250 mls to 500 mls, other sizes could also be produced.

It is practical in some circumstances for pouches of flowable material to be sold as clusters or grouping of pouches. Examples of cases where pouches would be conveniently sold as clusters would be, for example, for granular solids such as peanuts, sweets and pet food, or, for special offers such as three pouches for the price of two. Therefore, according to yet another aspect, the present invention also provides a method for producing a string of a plurality of clusters of sealed pouches, wherein the clusters are connected together by a rupturable portion, and, each cluster comprises a number of sealed pouches connected by a sealed portion and filled with flowable material. The cluster may include at least two pouches and the string may include at least two clusters. Alternatively, it is also possible by using the resilient backing member of the present invention to produce a string of pouches that contains only one cluster of pouches in which the pouches are connected by a sealed portion.

The method for producing the string of a plurality of clusters of sealed pouches comprises the steps of:
  (a) providing a heating jaw having a heating element and a corresponding backing jaw having a resilient backing member, the resilient backing member having a resilient body with a longitudinal shoulder surface and a longitudinal intermittent raised edge protruding from the shoulder surface;
  (b) driving a desired amount of a tubular web of film filled with flowable material between the heating jaw and the backing jaw;
  (c) closing the jaws by pressing the resilient backing element and the heating element together, activating the heating element using sealing parameters to produce the transverse sealed portion across the tubular web of film and provide seals on adjacent pouches, and, opening the jaws;
  (d) repeating steps (b) and (c) to produce a desired number of pouches in a cluster; and
  (e) driving a desired amount of a tubular web of film filled with flowable material between the heating jaw and the backing jaw;
  (f) closing the jaws by pressing the resilient backing element and the heating element together, activating the heating element using perforating parameters to produce the transverse rupturable portion across the tubular web of film and provide seals on adjacent pouches, and, opening the jaws;

(g) repeating steps (b) through (f) to produce a desired number of clusters in the string; and (h) separating a final pouch of the string from the tubular web of film.

In accordance with the above method, the present invention also provides a string of a plurality of clusters of sealed pouches filled with flowable material and formed from a tubular web of film, wherein the clusters are connected together by a rupturable portion, and, each cluster comprises a number of sealed pouches connected by a sealed portion.

DETAILED DESCRIPTION OF THE INVENTION

Referring particularly to the drawings, the figures are for the purpose of illustrating the present invention only and not for the purpose of limiting the scope of the appended claims.

Figure 1:
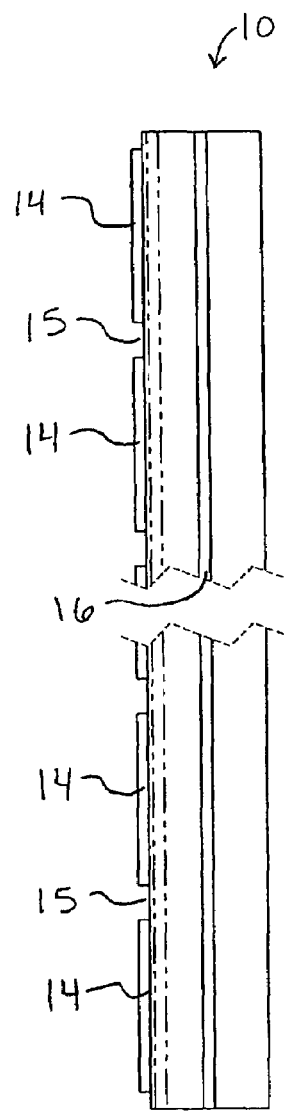
FIG. 1 shows a side elevation view of a resilient backing member, according to one embodiment of the invention.
Figure 2:
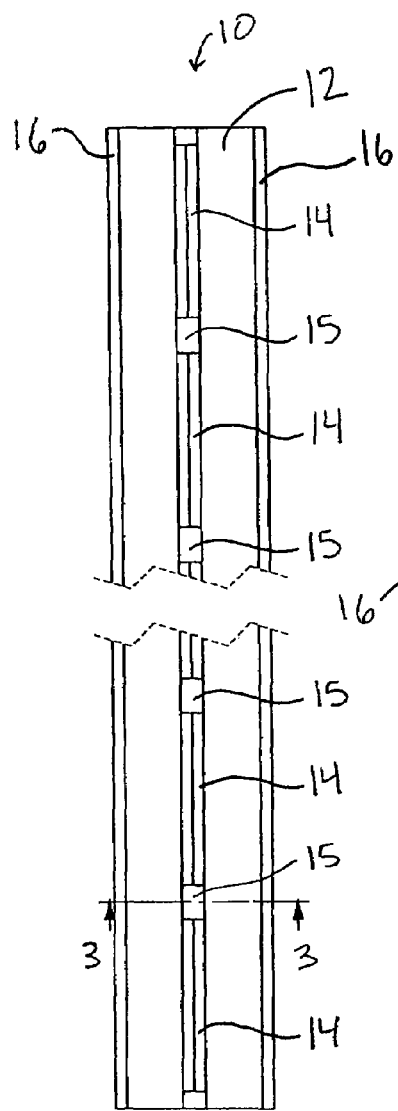
FIG. 2 shows a front elevation view of the resilient backing member of FIG. 1.
Figure 3:
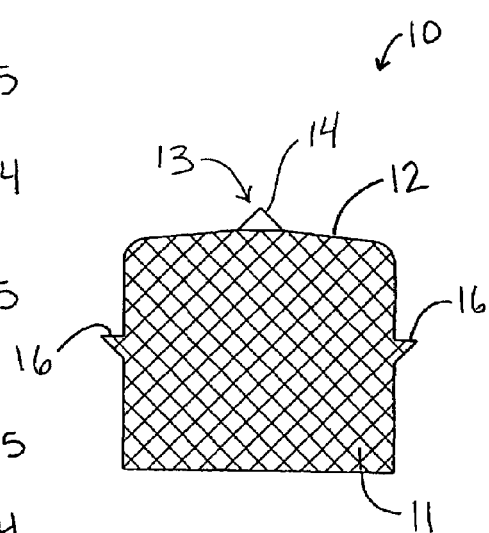
FIG. 3 shows a cross-sectional bottom elevation view of the resilient backing member of FIG. 1 along line 3-3 shown in FIG. 2.

Referring now to FIGS. 1-3, there is illustrated a resilient backing member shown generally at 10 according to the invention for use with a corresponding conventional impulse heating element (not shown). The resilient backing member 10 comprises a resilient body 11, a shoulder surface 12 and an intermittent raised edge shown generally at 13 protruding from the shoulder surface 12. The resilient backing member 10 may further comprise one or more retaining ledges 16 attached to the resilient body 11 that are used for securing the resilient member 10 into a backing jaw (not shown).

The configuration of the intermittent raised edge 13 is illustrated in FIGS. 1 and 2 and comprises a plurality of spaced apart portions 14 protruding from the shoulder surface 12 that are in a substantial longitudinal alignment and are separated by gaps 15. Other configurations of intermittent raised edge 13 may also be used and will be apparent to a person skilled in the art. For example, it is not essential that the spaced apart portions 14 be completely separated by gaps 15 but may be separated by regions of the raised edge 13 having a slightly reduced height (not shown). The intermittent raised edge 13 shown in FIGS. 1-3 has a triangular transverse cross-sectional profile but other shapes providing a generally sharpened and raised edge could also be used.

Figure 4:
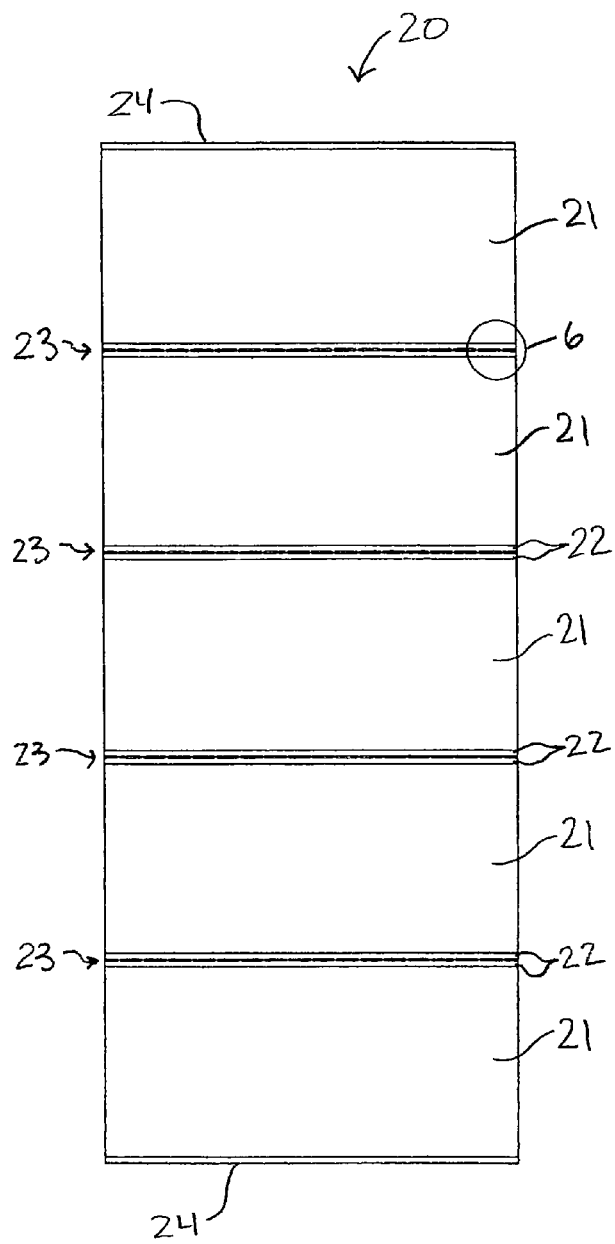
FIG. 4 shows a front elevation view of a string of pouches produced using the resilient backing member of FIG. 1, according to one embodiment of the invention.
Figure 5:
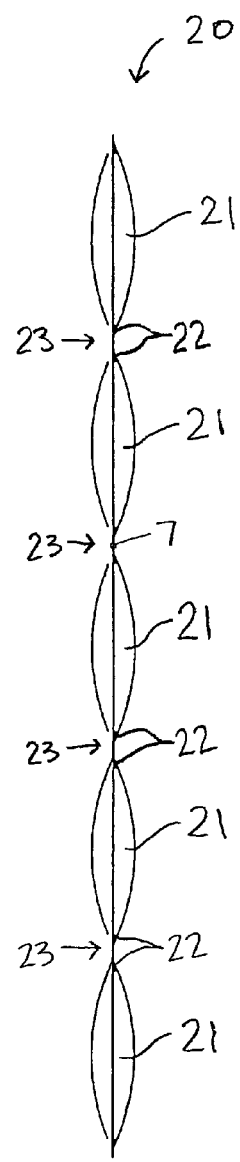
FIG. 5 shows a side elevation view of the string of pouches of FIG. 4.

FIGS. 4 and 5 illustrate the characteristics of a string, shown generally at 20, of easily separable pouches 21 made using the resilient backing member 10. The string 20 contains a plurality of pouches 21 that are connected by a transverse rupturable portion 23. In the vicinity of the transverse rupturable portion 23, each pouch 21 is individually sealed by a seal 22. The two extremities of the string 20 are defined by severed edges 24. While the typical size of pouches 21 produced using the resilient backing member 10 of the present invention is around 250 mls to 500 mls, other sizes could also be produced.

Figure 6:
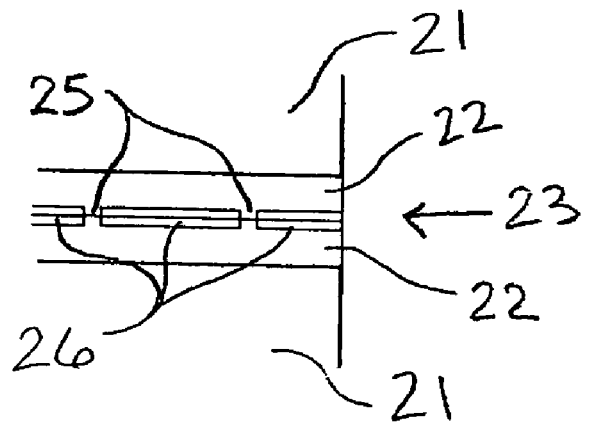
FIG. 6 shows an enlarged front detailed view of a transverse rupturable portion identified by reference number 6 in FIG. 4.
Figure 7:
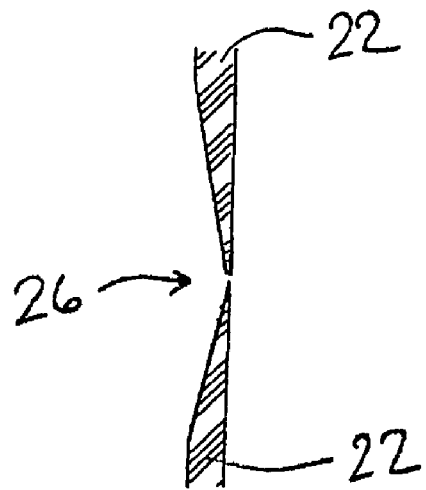
FIG. 7 shows an enlarged side detailed view of a transverse rupturable portion identified by reference number 7 in FIG. 5.

FIG. 6 shows a more detailed illustration of the area shown at 6 in FIG. 4. The transverse rupturable portion 23 comprises a plurality of perforations 26 that are separated by tabs 25. Similarly, FIG. 7 shows a detailed illustration of the area shown at 7 on FIG. 5 and clearly identifies the seals 22 as well as the perforations 26.

Figure 9:
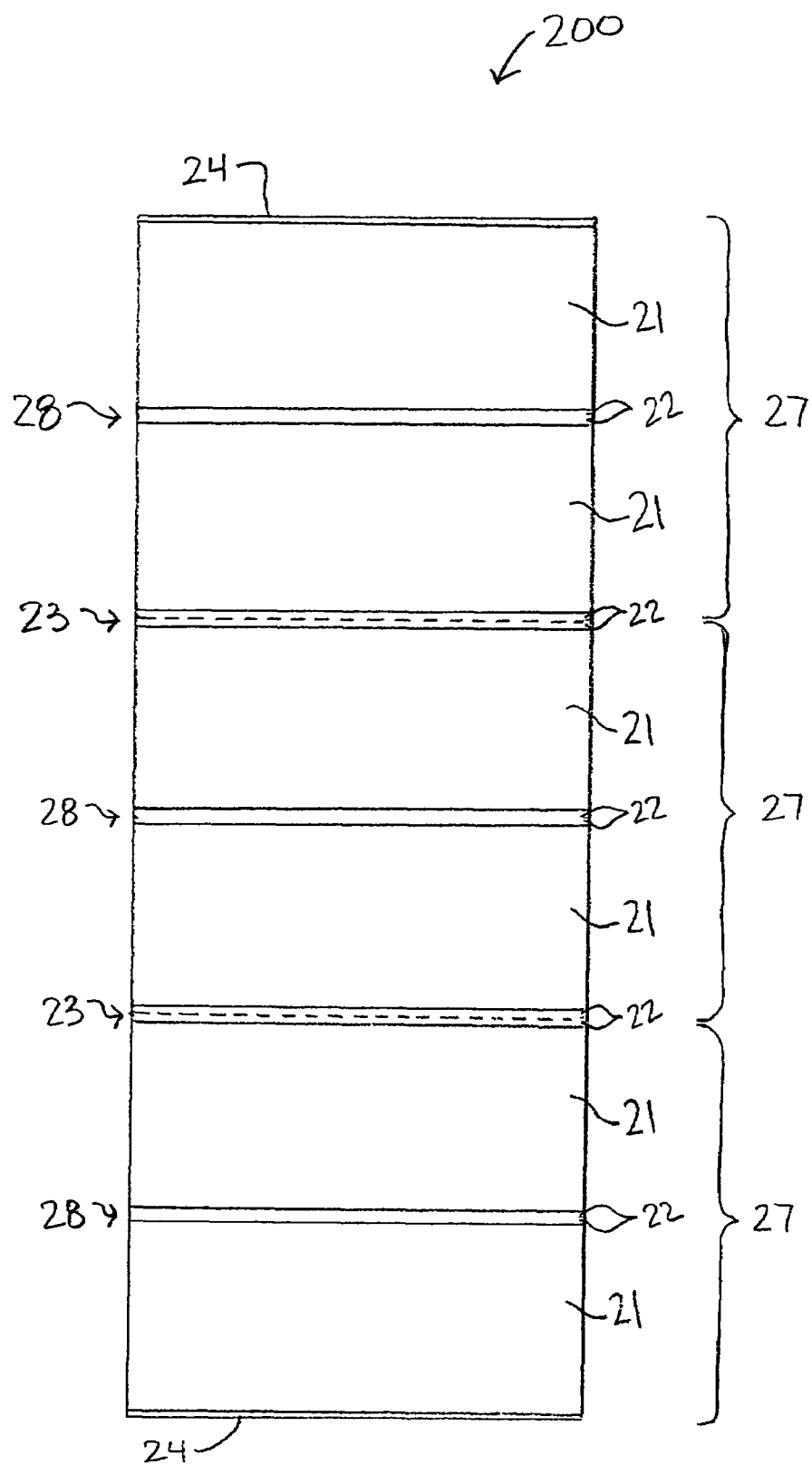
FIG. 9 shows a front elevation view of a string of pouches produced using the resilient backing member of FIG. 1, according to another embodiment of the invention.

FIG. 9 illustrates the characteristics of a string, shown generally at 200, of clusters shown generally at 27 of pouches 21 also made using the resilient backing member 10, according to another aspect of the present invention.

The clusters 27 of pouches 21 are connected by a transverse rupturable portion 23 and the individually sealed pouches 21 within the clusters 27 are connected by sealed portions 28. The two extremities of the string 200 are defined by severed edges 24.

During operation, the resilient backing member 10 is used in conjunction with a conventional impulse heating element (not shown) on a conventional pouch filling machine such as a vertical form, fill and seal machine (not shown). The resilient backing member 10 and heating element may be secured into a backing jaw and a corresponding heating jaw respectively. A tubular web of film (not shown) filled with flowable material is driven between the opposing jaws. Once a desired amount of film has passed between the jaws, the jaws are brought together or closed so that the resilient backing member 10 is pressed against the heating element. The backing jaw may be reciprocally movable with respect to the heating jaw, in which case the web of film must be halted before closing the jaws. Alternatively, the opposing jaws may be supported in a rotatable manner in order to accommodate a continuous flow of film.

Once the jaws are closed, a conventional programmable control system (not shown) activates the heating element in accordance with the type of operation required. The resilient backing member 10 of the present invention can be used in cooperation with the heating element to perform three distinct operations: (1) produce a transverse sealed portion 28 across the tubular web of film and provide seals 22 on adjacent pouches 21; (2) produce a transverse rupturable portion 23 across the tubular web of film and provide seals 22 on adjacent pouches 21; and, (3) sever the tubular web of film and provide seals 22 on a final pouch 21 of the string 20 and on the tubular web of film. The shoulder surface 12 of the resilient backing member 11 contributes mainly to the formation of the seals 22. The raised edge 13 contributes mainly to the formation of the rupturable portion and also to completely severing the tubular web of film. The fact that the resilient backing member 10 in cooperation with the heating element can perform three functions eliminates the need for a separate cutting blade for producing the rupturable portion 23. In order to perform operation (1), the controller activates the heating element using sealing parameters; in order to perform operation (2), the controller activates the heating element using perforating parameters; and, in order to perform operation (3), the controller activates the heating element using cutting parameters. The sealing parameters cause the heating element to reach a sealing temperature, the cutting parameters cause the heating element to reach a cutting temperature, and, the perforating parameters cause the heating element to reach a perforating temperature. After either one of operations (1), (2) and (3) has been completed, the jaws are opened and more of the tubular web of film is driven between the opposing jaws in order to form the next pouch 21.

In order to instruct the machine to produce the string 20 shown in FIG. 6 having a desired number of pouches 21, the sealing parameters may not be required. The control system may be programmed so that the heating element is activated using the cutting parameters only once the heating element has been activated using the perforating parameters a desired number of times. Alternatively, the control system may also be programmed to repeatedly activate the heating element using cutting parameters and thereby produce separated pouches 21.

The length of the gaps 15 in the raised edge 13 of the resilient backing member 10 in relation to the length of the spaced apart portions 14 may be selected based of the requirements for the transverse rupturable portion 23. Since the length of the gaps 15 in fact determine the width of the tabs 25 in the transverse rupturable portion 23, the number and length of the gaps 15 must be selected based on the strength of the rupturable portion that is desired. For example, a transverse rupturable portion 23 having fewer and/or narrower tabs 25 would be weaker and hence more easily ruptured than a transverse rupturable portion 23 having wider and a larger number of tabs 25.

It is also practical in some circumstances for pouches 21 of flowable material to be sold as clusters 27 or groupings of pouches 21 as shown in FIG. 9. Examples of cases where pouches 21 would be conveniently sold as clusters 27 would be, for example, for granular solid materials such as peanuts, sweets and pet food, or, for special offers such as three pouches for the price of two. Since the sealed portions 28 do not contain perforations or regions of reduced thickness, the pouches 21 within clusters 27 are not readily separable. In order to separate these pouches 21, scissors, a knife or the like can be used to cut through the sealed portions 28. The cluster may include at least two pouches and the string may include at least two clusters. Alternatively, it is also possible to produce a string of pouches that contains only one cluster of pouches in which the pouches are connected by a sealed portion.

In order to produce the string 200 of clusters 27, the control system is programmed to appropriately activate the heating element as described above based on the number of pouches per cluster and the number of clusters per string desired. Firstly, the heating element is repeatedly activated using the sealing parameters to produce the sealed portions 28 until a desired number of pouches 21 is produced to form a cluster 27. Next, the heating element is activated using the perforating parameters to produce the rupturable portion 23 between the clusters 27. The steps of producing pouches 21 and clusters 27 are repeated until the desired number of clusters 27 is produced within the string 200. Finally, when the end of a string 200 is reached the heating element is activated using the cutting parameters to sever the tubular web of film along severed edge 24.

The sealing, perforating and cutting parameters cause the temperature of the impulse heating element to reach a desired temperature and hold for a desired period of time. Typically, the temperature for each function is different while the time at temperature is kept relatively constant for all three functions. These parameters depend largely on factors such as film material, thickness and production rate but can readily be determined by a person familiar with the operation of impulse sealing devices. Typically, the perforating temperature required should be higher than the sealing temperature and in order to completely sever the tubular web of film, the cutting temperature should be about 20° C. to 40° C. higher than the perforating temperature. Typical parameters used for a high density polyethylene film having a thickness of 90 μm are listed below in table 1 as an example.

TABLE 1

Typical sealing, perforating and cutting parameters required for a high density polyethylene film having a thickness of 90 μm.

| Parameter | Heating Element Temperature (° C.) | Time (ms) |
| --- | --- | --- |
| Sealing | 115 | 400 |
| Perforating | 135 | 400 |
| Cutting | 165 | 400 |

The resilient backing member 10 could also be used in jaws that are adapted to lane machines where a plurality of strings 20 of pouches 21 are produced simultaneously, or, even within a scenario where rectangular arrays of separable pouches 21 are produced.

Figure 8:
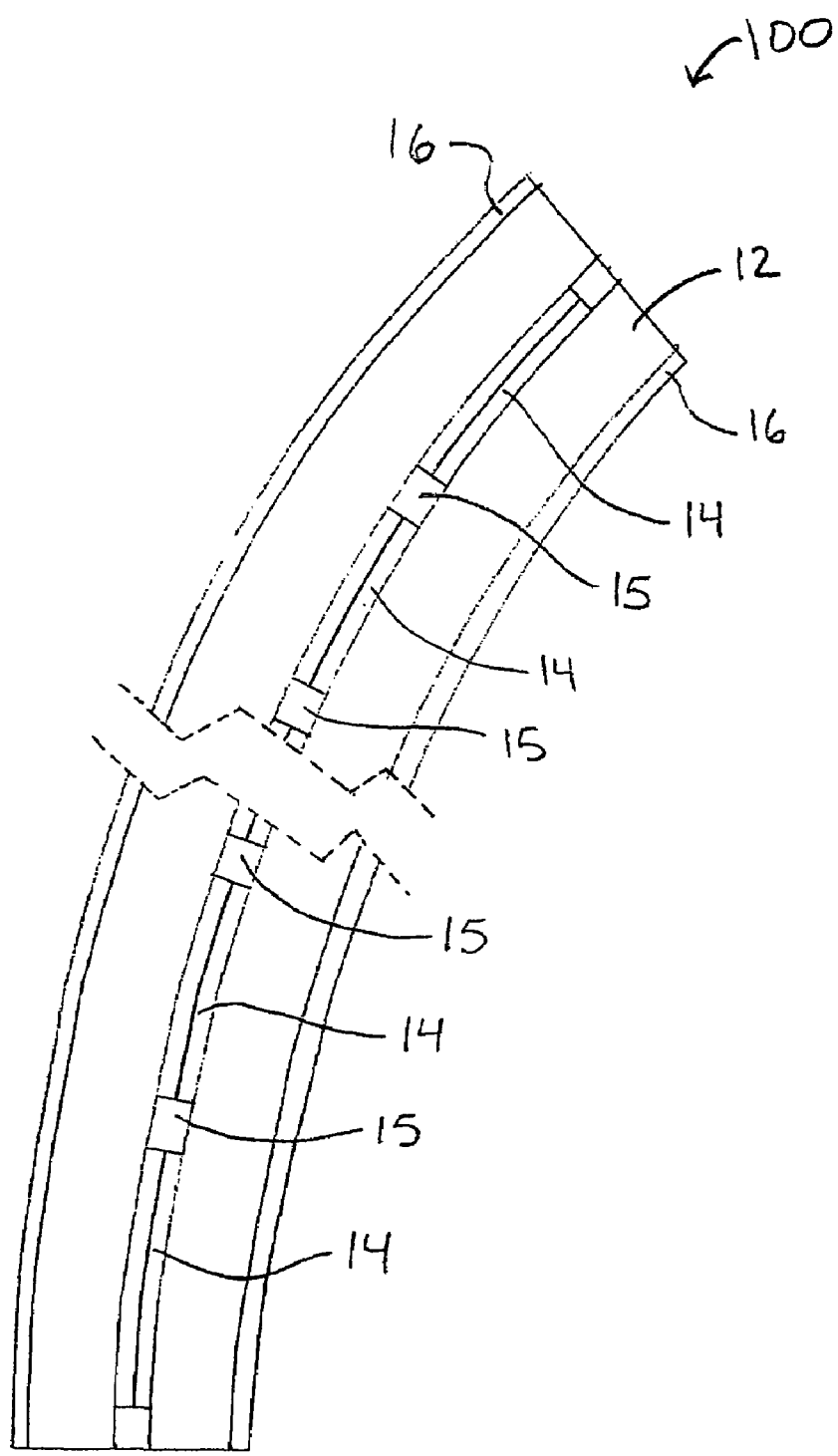
FIG. 8 shows a front elevation view of a resilient backing member, according to another embodiment of the invention.

The resilient backing member 10 of the present invention can be produced in the same manner as other conventional backing members and could have a linear profile, curved profile or a combination thereof in order to produce pouches having corresponding seals 22 and transverse rupturable portions 23 or sealed portions 28. A resilient backing member having a curved profile is shown generally at 100 in FIG. 8. The material selected for the resilient backing member 10 should be suitable for use with a conventional impulse heating element. Injection molded silicone rubber is commonly used for producing conventional resilient backing members. Accordingly, in order to produce a resilient backing member 100 with a curved profile, the resilient backing member 100 could be molded as such. Alternatively, a resilient backing member 10 having a linear profile could be secured to a backing jaw in a curved manner provided that the desired radius of curvature is permitting.

It will also be appreciated by those skilled in the art that changing the configuration of the transverse rupturable portion 23 produced by the pouch filling machine is done efficiently by simply replacing the resilient backing member 10, as no separate cutting blade is required. Further, it is also possible to modify an existing resilient backing member 10 by removing or modifying portions of the raised edge 13 in order to produce a transverse rupturable portion 23 having a different configuration.

Materials suitable for forming the string 20 of pouches 21 using the resilient backing member 10 of the present invention are well known to those of skill in the art. Generally the film should be heat sealable and have suitable properties (i.e. strength, flexibility) for carrying the desired product therein.

Polyolefins, especially polyethylene and ethylene copolymers are useful with this invention. Examples that can be used are low density polyethylene, linear low density polyethylene, metallocene polyethylene, ethylene vinyl acetate, acid co-polymer (e.g. DuPont™ Nucrel®) and ionomer (e.g. DuPont™ Surlyn®). Blends of these polymers can also be used.

Barrier films are also useful with this invention. These can be in the form of a laminant or coextrusion, generally in combination with a polyolefin. Examples of barrier materials that can be used are metallized Nylon®, or metallized polyester, or metallized polyvinyl alcohol, unmetallized polyvinyl alcohol, unmetallized ethyl vinyl alcohol, metallized ionomer (e.g. metallized DuPont™ Surlyn®) and metallized ethyl vinyl alcohol.

From the foregoing description, it can be seen that the present invention comprises resilient backing member which is used in cooperation with an impulse heating element to produce strings of pouches filled with flowable material. It will be appreciated by those skilled in the art that obvious changes can be made to the embodiments described in the foregoing description without departing from the broad inventive concept thereof. It is understood, therefore, that this invention is not limited to the particular embodiments disclosed, but is intended to cover all obvious modifications thereof which are within the scope and the spirit of the invention as defined by the appended claims.

The invention claimed is:

1. A method for producing a string of a plurality of sealed pouches connected by a transverse rupturable portion and filled with flowable material, said method comprising the steps of:
(a) providing a heating jaw having a heating element and a corresponding backing jaw having a resilient backing member, said resilient backing member having a resilient body with a longitudinal shoulder surface and a longitudinal intermittent raised edge protruding from said longitudinal shoulder surface;
(b) driving a desired amount of a tubular web of film filled with flowable material between said heating jaw and said backing jaw;
(c) closing said heating jaw and said backing jaw by pressing said resilient backing element and said heating element together, activating said heating element using perforating parameters to produce said transverse rupturable portion across said tubular web of film and provide seals on adjacent pouches, and opening said heating jaw and said backing jaw;
(d) repeating steps (b) and (c) to produce a desired number of pouches in said string;
(d1) driving a desired amount of said tubular web of film filled with flowable material between said heating jaw and said backing jaw; and
(e) separating a final pouch of said string from said tubular web of film by closing said heating jaw and said backing jaw by pressing said resilient element and said heating element together, activating said heating element using cutting parameters to transversely sever said tubular web of film and provide seals on the final pouch and on said tubular web of film, and opening said heating jaw and said backing jaw;
wherein the cutting parameters cause the temperature of said heating element to rise to a cutting temperature and the perforating parameters cause the temperature of said heating element to rise to a perforating temperature; the cutting temperature being higher than said perforating temperature.

2. The method according to claim 1, wherein said cutting temperature is 20° C. to 40° C. higher than said perforating temperature.

3. The method according to claim 1, wherein said backing jaw is reciprocally movable with respect to said heating jaw.

4. The method according to claim 3, wherein said tubular web of film driven between said heating jaw and said backing jaw is halted prior to closing said heating jaw and said backing jaw.

5. The method according to claim 1, wherein said heating element is controlled by a programmable control system.

6. The method according to claim 5, wherein the programmable control system is programmed to activate said heating jaw with said cutting parameters after said heating jaw has been repeatedly activated with said perforating parameters for a desired number of times.

7. A string of a plurality of sealed pouches connected by a rupturable portion, containing flowable material and formed from a tubular web of film, prepared using the method of claim 1.

8. The string of a plurality of sealed pouches according to claim 7, wherein said rupturable portion comprises a perforation.

9. The string of a plurality of sealed pouches according to claim 7, wherein said rupturable portion comprises a weakened region of reduced thickness.

10. A method for producing a string of a plurality of clusters of sealed pouches, wherein said clusters are connected together by a rupturable portion, and, each cluster comprises a number of sealed pouches connected by a sealed portion and filled with flowable material, said method comprising the steps of:
(a) providing a heating jaw having a heating element and a corresponding backing jaw having a resilient backing member, said resilient backing member having a resilient body with a longitudinal shoulder surface and a longitudinal intermittent raised edge protruding from said shoulder surface;
(b) driving a desired amount of a tubular web of film filled with flowable material between said heating jaw and said backing jaw;
(c) dosing said healing jaw and said backing jaw by pressing said resilient backing element and said healing element together, activating said healing element using sealing parameters to produce a transverse sealed portion across said tubular web of film and provide seals on adjacent pouches, and, opening said heating jaw and said backing jaw;
(d) repeating steps (b) and (c) to produce a desired number of pouches in a cluster; and
(e) driving a desired amount of a tubular web of film filled with flowable material between said heating jaw and said backing jaw;
(f) closing said heating jaw and said backing jaw-by pressing said resilient backing element and said heating element together, activating said heating element using perforating parameters to produce said transverse rupturable portion across said tubular web of film and provide seals on adjacent pouches, and, opening said heating jaw and said backing jaw;
(g) repeating steps (b) through (f) to produce a desired number of clusters in said string;
(g1) driving a desired amount of a tubular web of film filled with flowable material between said heating jaw and said backing jaw; and
(h) separating a final pouch of said string from said tubular web of film by closing said heating jaw and said backing jaw by pressing said resilient element and said heating element together, activating said heating element using cutting parameters to transversely sever said tubular web of film and provide seals on said final pouch and on said tubular web of film, and opening said heating jaw and said backing jaw;
wherein said sealing parameters cause the temperature of said heating element to rise to a sealing temperature, said perforating parameters cause the temperature of said heating element to rise to a perforating temperature, and, said cutting parameters cause the temperature of said heating element to rise to a cutting temperature; said cutting temperature being higher than said perforating temperature, and said perforating temperature being higher than said sealing temperature.

11. The method according to claim 10, wherein said cutting temperature is 20° C. to 40° C. higher than said perforating temperature.

12. The method according to claim 10, wherein said heating element is controlled by a programmable control system.

13. The string of a plurality of clusters of sealed pouches filled with flowable material and formed from a tubular web of film, wherein said clusters are connected together by a rupturable portion, and, each cluster comprises a number of sealed pouches connected by a sealed portion, said string being prepared using the method of claim 10.

14. The string of a plurality of sealed pouches according to claim 13, wherein said rupturable portion comprises a perforation.

15. The string of a plurality of sealed pouches according to claim 13, wherein said rupturable portion comprises a weakened region of reduced thickness.

* * * * *